US008495349B2

(12) United States Patent
Lewis et al.

(10) Patent No.: US 8,495,349 B2
(45) Date of Patent: Jul. 23, 2013

(54) GENERATING A PRIMARY BIOS CODE MEMORY ADDRESS AND A RECOVERY BIOS CODE MEMORY ADDRESS, WHERE THE RECOVERY BIOS SERVICE CODE IS LOADED WHEN THE PRIMARY BIOS CODE FAILS TO EXECUTE

(75) Inventors: Thomas F. Lewis, Raleigh, NC (US); Pivithuru S. Perera, Cary, NC (US); Robert M. Piper, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1054 days.

(21) Appl. No.: 12/248,434

(22) Filed: Oct. 9, 2008

(65) Prior Publication Data

US 2010/0095104 A1    Apr. 15, 2010

(51) Int. Cl.
*G06F 15/177* (2006.01)
*G06F 9/00* (2006.01)
*G06F 11/00* (2006.01)

(52) U.S. Cl.
USPC .................................. 713/2; 713/1; 714/36

(58) Field of Classification Search
USPC .............................. 713/2, 1; 714/36
See application file for complete search history.

(56) References Cited

U.S. PATENT DOCUMENTS

| | | | |
|---|---|---|---|
| 5,889,987 A * | 3/1999 | Nelson et al. ...................... 713/2 |
| 6,119,226 A | 9/2000 | Shiau et al. | |
| 6,185,696 B1 * | 2/2001 | Noll ................................ 714/6.1 |
| 6,223,271 B1 | 4/2001 | Cepulis | |
| 6,321,332 B1 * | 11/2001 | Nelson et al. ...................... 713/2 |
| 6,370,642 B1 * | 4/2002 | Chiang et al. ...................... 713/1 |
| 6,539,474 B2 | 3/2003 | Matsuura | |
| 6,598,157 B1 | 7/2003 | McKee | |
| 6,651,188 B2 * | 11/2003 | Harding et al. ............. 714/38.13 |
| 6,892,323 B2 * | 5/2005 | Lin ................................ 714/36 |
| 7,114,052 B2 | 9/2006 | Shoji | |
| 7,143,275 B2 | 11/2006 | Cepulis et al. | |
| 7,305,668 B2 * | 12/2007 | Kennedy et al. ............. 717/168 |
| 2002/0161962 A1 | 10/2002 | Furuyama et al. | |
| 2003/0076311 A1 * | 4/2003 | Lin et al. ........................ 345/204 |
| 2004/0032789 A1 | 2/2004 | Ngo et al. | |
| 2008/0141016 A1 * | 6/2008 | Chang et al. ...................... 713/2 |

FOREIGN PATENT DOCUMENTS

EP         0902356 A2     3/1999

* cited by examiner

*Primary Examiner* — Thomas Lee
*Assistant Examiner* — Terrell Johnson
(74) *Attorney, Agent, or Firm* — Brandon C. Kennedy; Cynthia G. Seal; Biggers & Ohanian, LLP.

(57) ABSTRACT

Administering computer processor execution of BIOS code that includes a primary BIOS code and a recovery BIOS code stored in ROM, the ROM operatively coupled to a control module and the processor, where administering processor execution of the BIOS code includes determining, by the control module, a size of the ROM; generating, by the control module in dependence upon the size of the ROM, an address for the primary BIOS code and an address for the recovery BIOS code; starting, by the control module, operation of the processor for execution of the primary BIOS code including providing, to the processor, the address for the primary BIOS code; and if executing the primary BIOS code fails, restarting, by the control module, operation of the processor for execution of the recovery BIOS code including providing, to the processor, the address for the recovery BIOS code to the processor.

9 Claims, 4 Drawing Sheets

US 8,495,349 B2

GENERATING A PRIMARY BIOS CODE MEMORY ADDRESS AND A RECOVERY BIOS CODE MEMORY ADDRESS, WHERE THE RECOVERY BIOS SERVICE CODE IS LOADED WHEN THE PRIMARY BIOS CODE FAILS TO EXECUTE

BACKGROUND OF THE INVENTION

1. Field of the Invention

The field of the invention is data processing, or, more specifically, methods, apparatus, and products for administering computer processor execution of BIOS code.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Processors of computers today typically execute Basic Input/Output Services ('BIOS') code upon startup. In many computers two modules of the BIOS code are present in Read-Only Memory ('ROM'), a primary BIOS code and a recovery or backup BIOS code. If execution of the primary BIOS code fails upon startup, the processor is restarted and attempts to execute the recovery BIOS code. In most computers the primary and recovery BIOS code are of the same size and together fill available memory of the ROM. As such, the memory address of the primary BIOS code is at the 'top' of the memory, the first available memory address, and the memory address of recovery BIOS code is a halfway point in the ROM, that is, in the middle of addressable memory. Such addresses are hard-programmed into the processor prior to typical operation of the computer.

From time to time, however, during software and hardware development of electrical circuits as one example, such BIOS code may be altered by BIOS developers, increasing in size. As such, the size of the ROM in which the BIOS code is disposed must also be increased. The addresses of the primary and recovery BIOS code, previously hard-programmed into the processor are no longer correct for the ROM of increased size. Each change of ROM size therefore typically requires a corresponding reprogramming of the processor with new addresses for the BIOS code. Such reprogramming is inefficient in software and hardware development.

SUMMARY OF THE INVENTION

Methods, apparatus, and products for administering computer processor execution of BIOS code, the BIOS code including a primary BIOS code and a recovery BIOS code stored in ROM, the ROM operatively coupled to a control module and the processor, the control module configured to control startup operations of the processor, where administering processor execution of the BIOS code includes determining, by the control module, a size of the ROM; generating, by the control module in dependence upon the size of the ROM, an address for the primary BIOS code and an address for the recovery BIOS code; starting, by the control module, operation of the processor for execution of the primary BIOS code including providing, to the processor, the address for the primary BIOS code; and if executing the primary BIOS code fails, restarting, by the control module, operation of the processor for execution of the recovery BIOS code including providing, to the processor, the address for the recovery BIOS code to the processor.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
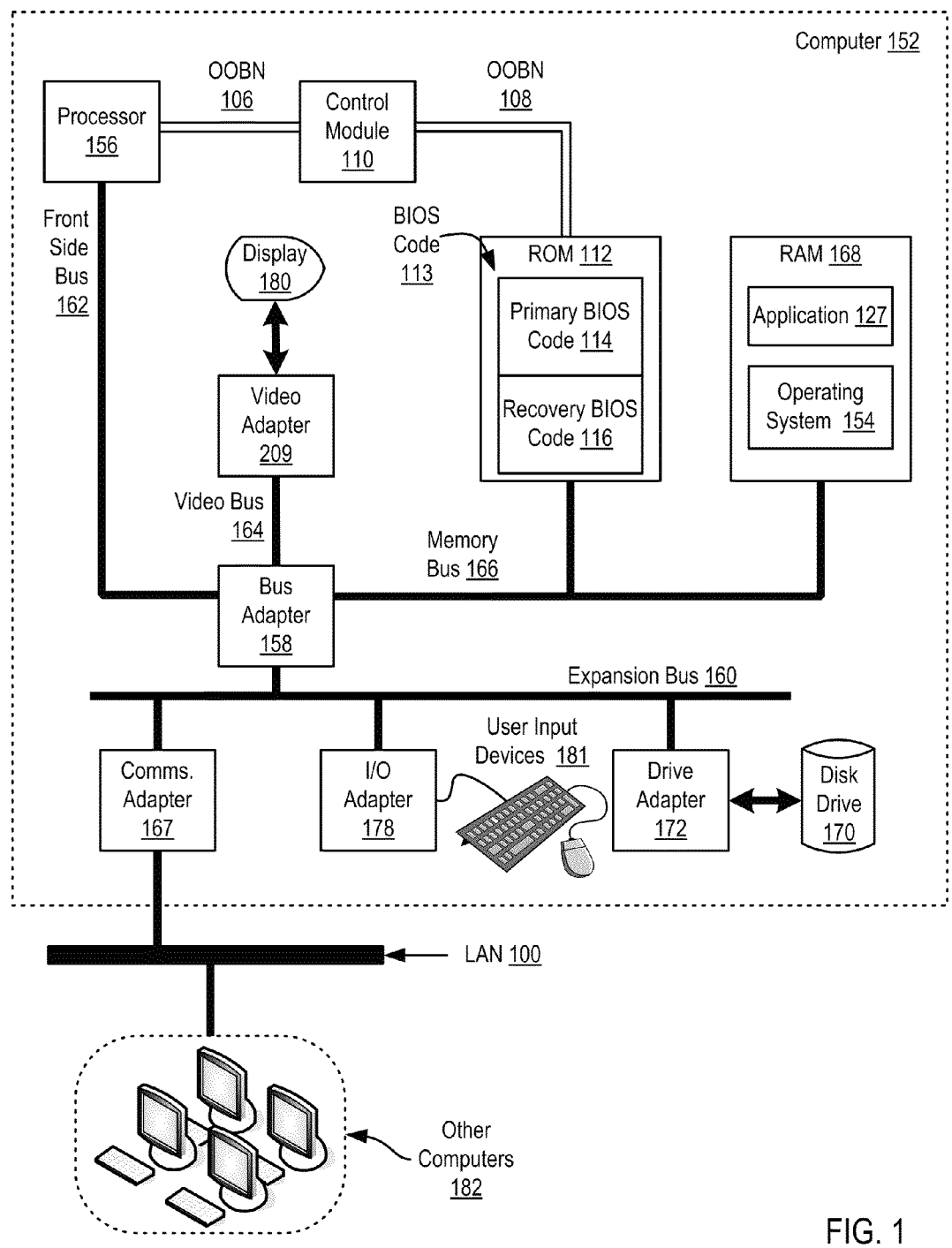
FIG. 1 sets forth a block diagram of an exemplary system for administering computer processor execution of BIOS code according to embodiments of the present invention.

Exemplary methods, apparatus, and products for administering computer processor execution of Basic Input/Output Services ('BIOS') code in accordance with the present invention are described with reference to the accompanying drawings, beginning with FIG. 1. FIG. 1 sets forth a block diagram of an exemplary system for administering computer processor execution of BIOS code according to embodiments of the present invention. The system of FIG. 1 includes a computer (152) which in turn includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an application program (127), a module of computer program instructions that carries out user-level data processing tasks. Such an application program (127) may include a word processor, spreadsheet application, multimedia playback software, and so on. Also stored in RAM (168) is an operating system (154). Operating systems useful in computers for which computer processor execution of BIOS code is administered according to embodiments of the present invention include UNIX™, Linux™, Microsoft XP™, AIX™, IBM's i5/OS™ and others as will occur to those of skill in the art. The operating system (154) and application program (127) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for administering computer processor execution of BIOS code according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for administering computer processor execution of BIOS code according to embodiments of the present invention include modems for wired dial-up communications, Ethernet (IEEE 802.3) adapters for wired data communications network communications, and 802.11 adapters for wireless data communications network communications.

The computer of FIG. 1 also includes a control module (110) connected through an out of band data communications network (106) to the processor (156) and through an out-of-band data communications network (108) to Read-Only Memory ('ROM') (112). In addition to being connected to the processor, the ROM (112) in the example of FIG. 1 is also coupled to the processor (156) through the front side bus (162) bus adapter (158) and the memory bus (166). Stored in ROM (112) is BIOS code (113) for the computer (152).

BIOS refers to the firmware code, typically embedded on a processor stored in ROM, run by a computer processor when a computer is first powered on. BIOS code identifies and initializes various devices that make up a computer and provides a small library of basic Input/Output functions that can be called to operate and control the peripherals such as the keyboard, primitive (800×600) display functions and so forth. Identifying and initializing such system components prepares the computer into a secure, low capability state, so other software programs stored on various media can be loaded, executed, and given control of the processor and computer. The process carried out by BIOS code is known as booting, or booting up, which is short for bootstrapping. Among some classes of computers, the generic terms boot monitor, boot loader or boot ROM are commonly used to refer to BIOS code.

In the example of FIG. 1, the BIOS code (113) includes a primary BIOS code (114) and a recovery BIOS code (116). Primary BIOS code is BIOS code designated for execution upon initial startup of the processor. From time to time, however, execution of the primary BIOS fails. Such failures may occur for many reasons, including for example, an error in the primary BIOS code that causes the failure. When BIOS fails a computer system may never fully start but may instead 'hang' in an inoperative state. A recovery BIOS code is BIOS code designated for execution upon a failure of the primary BIOS code. Although the primary BIOS code (114) and recovery BIOS code (116) in the example of FIG. 1 may be identical code, in many embodiments the recovery BIOS code (116) is a previous, stable version of BIOS code for the processor (156) while the primary BIOS code (114) is an newer, possibly unstable version of BIOS code. In many embodiments, regardless of whether the two include identical code, the primary and recovery BIOS code are of the same, or nearly the same size.

The control module (110) may be computer hardware, software, or some combination of hardware and software configured to control startup operations of the processor and operates generally for administering execution of the BIOS code (113). The control module (110) may for example, include its own CPU or processing core as well as computer memory local to the control module (110). The control module (110) in the example of FIG. 1 administers computer processor execution of BIOS code (113) by determining, by the control module, a size of the ROM (112); generating, by the control module in dependence upon the size of the ROM, an address for the primary BIOS code (114) and an address for the recovery BIOS code (116); starting, by the control module (110), operation of the processor (156) for execution of the primary BIOS code (114) including providing, to the processor (156), the address for the primary BIOS code (114); and if executing the primary BIOS code fails (114), restarting, by the control module (110), operation of the processor (156) for execution of the recovery BIOS code (116) including providing, to the processor (156), the address for the recovery BIOS code (116) to the processor (156).

The arrangement of computers, control module (110), ROM (112), and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

A control module (110) that administers computer processor execution of BIOS code according to embodiments of the present invention may control startup operations of a computer's primary processor such as the processor (156) of the computer (152) in the example of FIG. 1 or, alternatively, the control module may control startup operations of another, secondary processor, a processor of an adapter or other component of a larger computer system, for example. For further explanation, therefore, FIG. 2 sets forth a block diagram of an exemplary microcontroller in which a control module (110) administers computer processor execution of BIOS code according to embodiments of the present invention.

Figure 2:
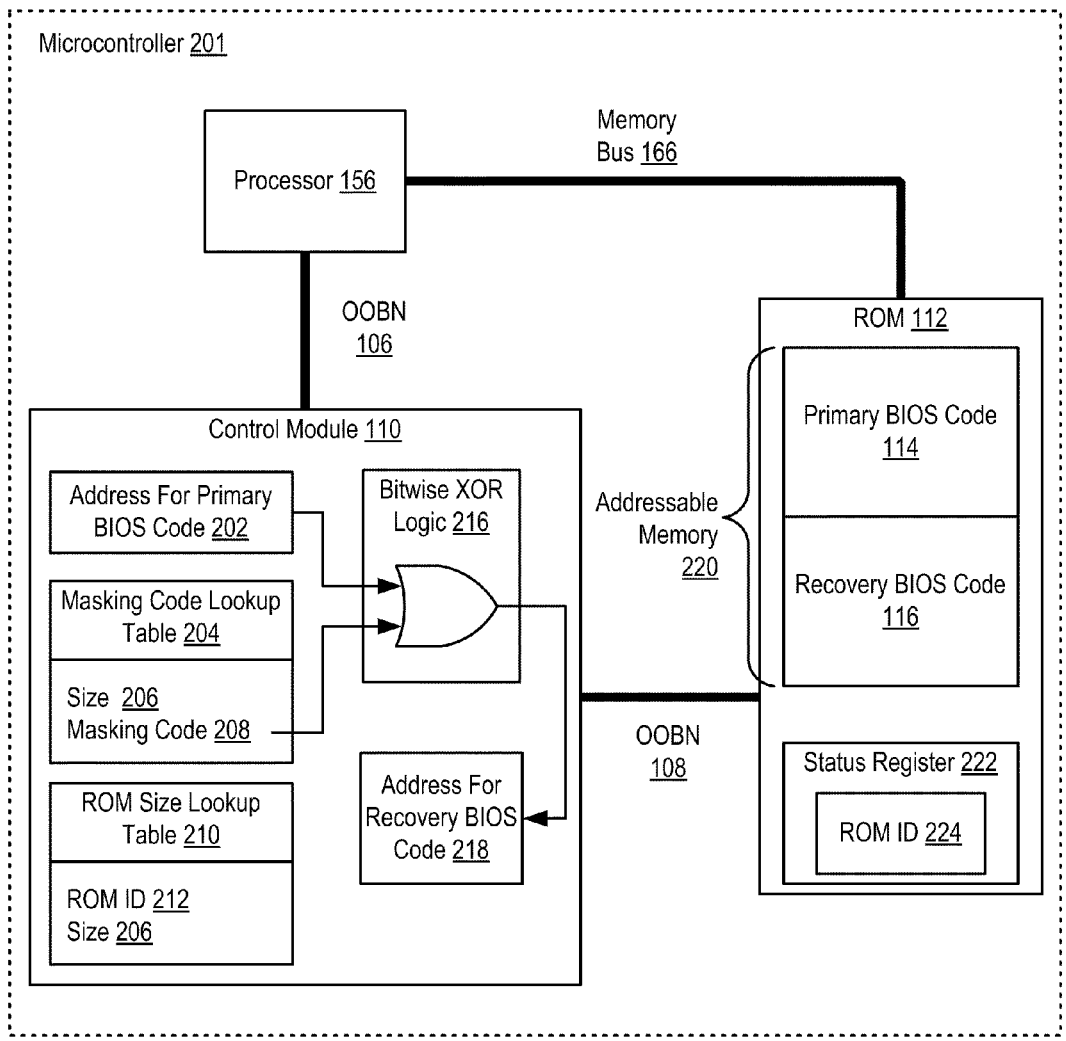
FIG. 2 sets forth a block diagram of an exemplary microcontroller in which a control module administers computer processor execution of BIOS code according to embodiments of the present invention.

The microcontroller (201) in the example of FIG. 2 includes a processor (156) coupled through a high speed memory bus to computer memory in the form of ROM (112). The processor (156) is also coupled through an out-of-band network (106) to a control module (110) configured to administer computer processor (156) execution of BIOS code according to embodiments of the present invention and controls startup operations of the processor (156) through the out-of-band network. The out-of-band network may be implemented with a 1-wire bus, an inter-integrated circuit ($I^2C$) bus, a System Management Bus ('SMB'), a Universal Serial Bus ('USB'), a PCI bus, a Small Computer System Interface ('SCSI') bus, or other data communications bus as will occur to readers of skill in the art. Stored in addressable memory (220) of ROM (112) is a primary BIOS code (114) and a recovery BIOS code (116).

The control module (110) in the example of FIG. 2 administers computer processor (156) execution of BIOS code by determining a size of the ROM (112); generating, in dependence upon the size of the ROM (112), an address (202) for the primary BIOS code (114) and an address (218) for the recovery BIOS code; starting operation of the processor (156) for execution of the primary BIOS code (114) including providing, to the processor, the address (202) for the primary BIOS code; and if executing the primary BIOS code (114) fails, restarting operation of the processor (156) for execution of the recovery BIOS code (116) including providing, to the processor (156), the address (218) for the recovery BIOS code (116) to the processor (156).

In the example microcontroller (201) of FIG. 2, the control module (110) may determine a size of the ROM (112) by retrieving, through the out-of-band network (108) from a memory status register (222) of the ROM (112), an identifier (224) of the ROM and finding the size (206) of the ROM (112) with the ROM identifier (224) in a lookup table (210) that includes records associating sizes (206) of ROMs with ROM identifiers (212). The control module (110) may alternatively be coupled to the ROM through the same high speed memory bus (166) that couples the processor (156) to the ROM (112). In such an embodiment, the control module may retrieve the ROM identifier (224) through the memory bus (166) from the memory status register. A memory status register (222) is a hardware register that stores information describing the ROM (112) within which the hardware register is implemented. A ROM identifier (224) as the term is used in this specification may be any digital code, a bit string, or other data that identifies the ROM (112). A ROM identifier (224) may be a bit string that identifies a device manufacturer, a device identifier, and a size code of the ROM (112), for example.

The control module may generating, in dependence upon the size of the ROM (112), an address (202) for the primary BIOS code (114) generating a first available memory address that includes a bit pattern of all ones as the address of the primary BIOS code. An address of all ones, in many embodiments, represents the 'top' of the memory or the first available address in the addressable memory range (220) of the ROM (112). The control module generates the address for the primary BIOS code, the bit pattern of the first available memory address, with a length used for addressing a ROM of the determined size (206). That is, the control module calculates the address length, number of bits in the address, and sets all bits equal to one. The control module may calculate the address length for byte-addressable memory in accordance with:

$$AddressLength = Log_2(MemorySize),$$

where 'AddressLength' is the address length for the address of the primary BIOS code and 'MemorySize' is the identified size of the ROM (112). A byte-addressable ROM (112) of 4 gigabytes ('GB'), for example, has an address length of 32 bits, while a byte-addressable ROM (112) of 1 GB, includes an address of 30 bits. In this way, ROMs of different sizes may be changed in and out of the circuit and the circuit may adjust without the need for additional reprogramming of new addresses.

The control module may then generate an address (202) for the recovery BIOS code by determining a masking code (208) in dependence upon the size (206) of the ROM and inverting, by use of the masking code (208), the most significant bit of the address of the primary BIOS code (202). That is, the control module uses, as the address (218) for the recovery BIOS code (116), the primary BIOS code having an inverted, most significant bit. The masking code (208) in the example of FIG. 2 is a bit pattern designated for inverting a most significant bit of the address of the primary BIOS code. The masking code may be of any length greater or equal to the length of the address of the primary BIOS code. The control module inverts the most significant bit of the address of the primary BIOS code by performing a bitwise XOR operation (216) with the masking code (208) and address (202) of the primary BIOS code, where one bit of the masking code corresponding in location to the most significant bit of the address of the primary BIOS code has a value of one and all other bits of the masking code having a value of zero. Consider, as an example, a primary address of 1111 and a masking code of 1000. A bitwise XOR operation provides an address of 0111. As mentioned above, in many embodiments the primary and recovery BIOS codes are of the same size. Also in many embodiments, the primary and recovery BIOS codes fill the entire address memory range of the ROM (112). In such embodiments the primary BIOS code is stored at an address characterized as the 'top' of memory. While the address of the primary BIOS code may be characterized as the 'top' of memory, the address of the recovery BIOS code may be characterized as a 'halfway point' in memory. Inverting the most significant bit of the address of the primary BIOS code produces an address 'halfway' in memory, the memory address at which the recovery BIOS code is stored. Such a masking code is depicted in the example of FIG. 2 as being stored in a masking code lookup table (204) in association with a size (206) of the ROM (112). Readers of skill in the art will recognize that such a table may be implemented in a register of the processor where the size (206) is used as index into the register to find a masking code (208).

Figure 3:
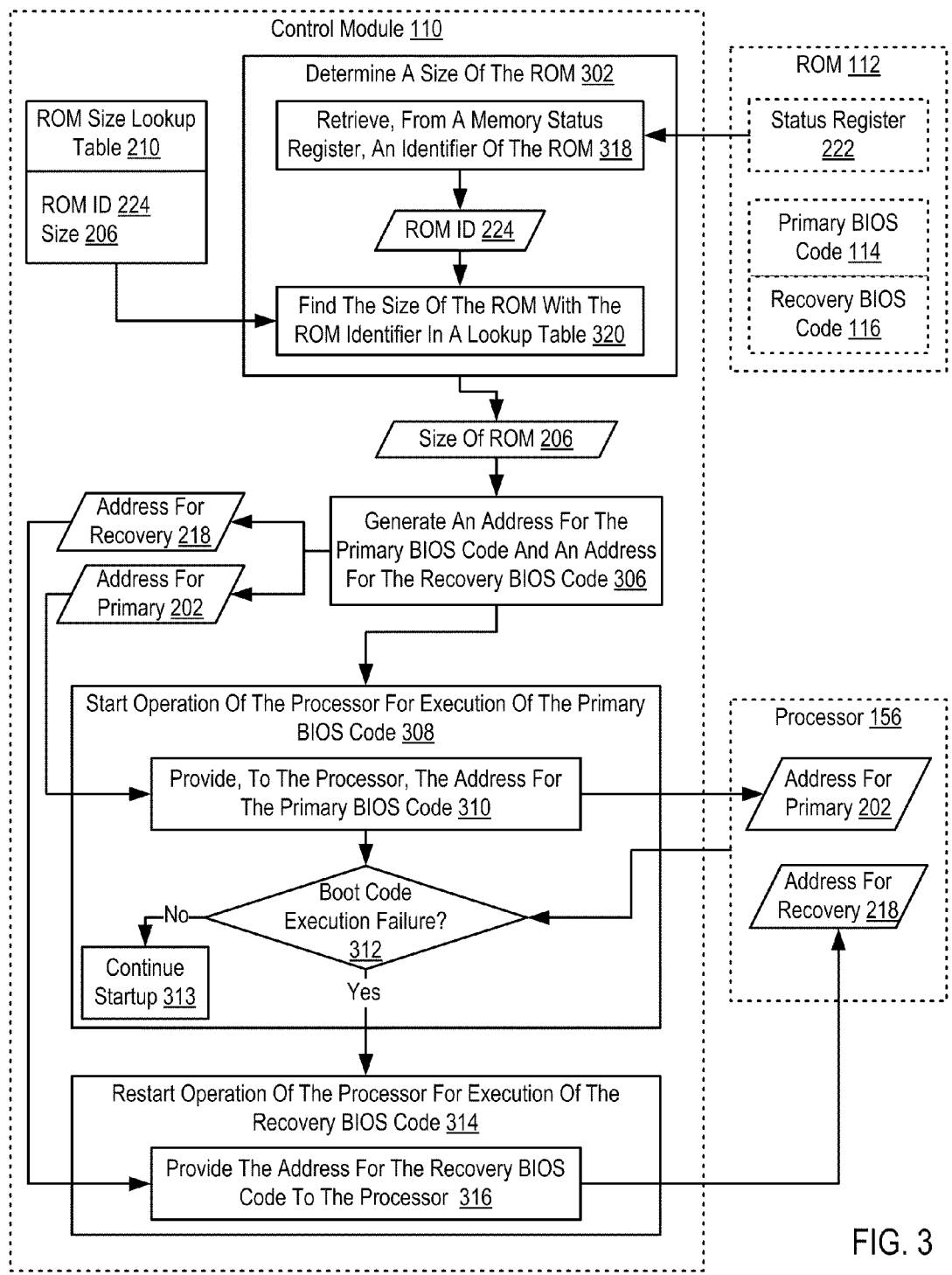
FIG. 3 sets forth a flow chart illustrating an exemplary method for administering computer processor execution of BIOS code according to embodiments of the present invention.

For further explanation, FIG. 3 sets forth a flow chart illustrating an exemplary method for administering computer processor execution of BIOS code according to embodiments of the present invention. The BIOS code in the method of FIG. 3 includes a primary BIOS code (114) and a recovery BIOS code (116), both stored in ROM (112). In the method of FIG. 3 the ROM (112) is operatively coupled to a control module (110) and a processor (156). The example control module (110) in the method of FIG. 3 is configured to control startup operations of the processor (156).

The method of FIG. 3 includes determining (302), by the control module (110), a size (206) of the ROM (112). In the method of FIG. 3, determining (302), by the control module (110), a size (206) of the ROM (112) is carried out by retrieving (318), from a memory status register (222) of the ROM (112), an identifier (224) of the ROM and finding (320) the size (206) of the ROM (112) with the ROM identifier (224) in a lookup table (210) comprising a plurality of records associating sizes (206) of ROMs with ROM identifiers (224).

The method of FIG. 3 also includes generating (306), by the control module (110) in dependence upon the size (306) of the ROM (112), an address (202) for the primary BIOS code (114) and an address (218) for the recovery BIOS code (116).

The method of FIG. 3 also includes starting (308), by the control module (110), operation of the processor (156) for execution of the primary BIOS code (114). In the method of FIG. 3, starting (308), by the control module (110), operation of the processor (156) for execution of the primary BIOS code (114) includes providing (310), to the processor (156), the address (202) for the primary BIOS code (114). Providing (310), to the processor (156), the address (202) for the primary BIOS code (114) may be carried out by providing the address to the processor through an out-of-band bus designated for such a purpose or in other ways as will occur to readers of skill in the art.

In the method of FIG. 3, starting (308) operation of the processor (156) for execution of the primary BIOS code (114) also includes determining (312) whether execution of the primary BIOS code failed. Determining (312) whether execution of the primary BIOS code failed may include checking a flag in a status register representing a stall in startup, monitoring an instruction register to identify a halt condition in execution by the processor, and in other ways as will occur to readers of skill in the art.

If executing the primary BIOS code does not fail, the method of FIG. 3 continues by continuing (313) along with processor startup routines, that is, execution of primary BIOS code. If executing the primary BIOS code fails, however, the method of FIG. 3 continues by restarting (314), by the control module (110), operation of the processor (156) for execution of the recovery BIOS code (116). Restarting (314), by the control module (110), operation of the processor (156) for execution of the recovery BIOS code (116) includes providing, to the processor (156), the address (218) for the recovery BIOS code (116) to the processor (156). After providing the address for the recovery BIOS code (116) to the processor (156) the control module, through an out-of-band network, may toggle a reset line of the processor (156) to restart operation of the processor. Providing, to the processor (156), the address (218) for the recovery BIOS code (116) to the processor (156) may be carried out in a manner similar to that of providing the address for the primary BIOS code, through an out-of-band data communications network designated for such purpose or in other ways as will occur to readers of skill in the art.

Figure 4:
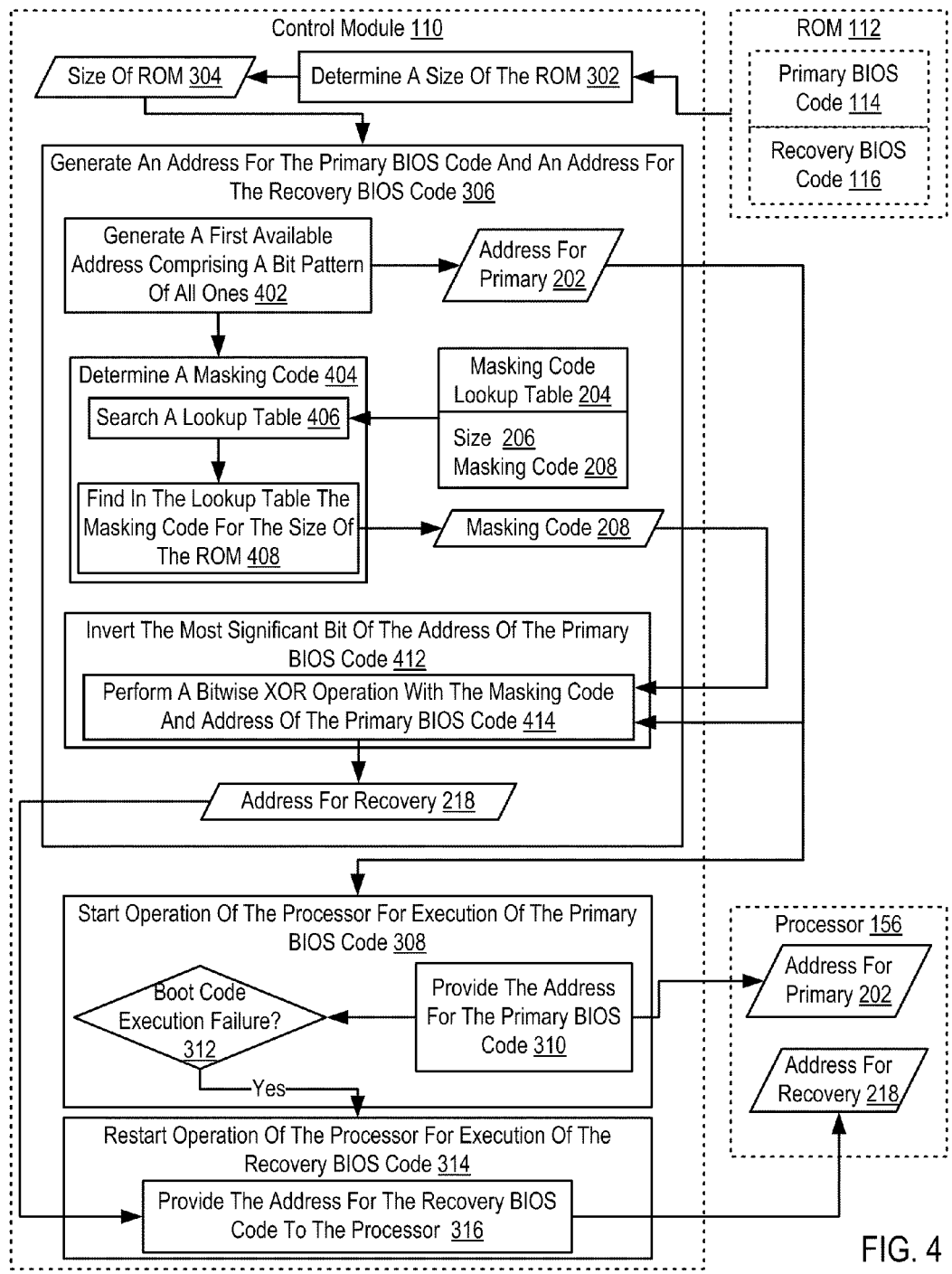
FIG. 4 sets forth a flow chart illustrating a further exemplary method for administering computer processor execution of BIOS code according to embodiments of the present invention.

For further explanation, FIG. 4 sets forth a flow chart illustrating a further exemplary method for administering computer processor execution of BIOS code according to embodiments of the present invention. The method of FIG. 4 is similar to the method of FIG. 3 in that in the method of FIG. 4 the BIOS code includes a primary (114) and a recovery (116) BIOS code disposed in ROM (112), where the ROM (112) is operatively coupled to a control module (110) and a processor (156) and the control module (110) is configured to control startup operations of the processor (156). The method of FIG. 4 is also similar to the method of FIG. 3 in that the method of FIG. 4 also includes determining (302) a size (206) of the ROM (112); generating (306) an address (202) for the primary BIOS code (114) and an address (218) for the recovery BIOS code (116); starting (308) operation of the processor (156) for execution of the primary BIOS code (114); and if executing the primary BIOS code fails, restarting (314) operation of the processor (156) for execution of the recovery BIOS code (116).

The method of FIG. 4 differs from the method of FIG. 3, however, in that in the method of FIG. 4 generating (306) an address (202) for the primary BIOS code (114) and an address (218) for the recovery BIOS code (116) includes generating (402) a first available memory address that includes a bit pattern of all ones as the address (202) of the primary BIOS code; determining (404) a masking code (208) in dependence upon the size of the ROM (112); and inverting (412), by use of the masking code (208), to generate the address (218) of recovery BIOS code (116), the most significant bit of the address (202) of the primary BIOS code (114).

In the method of FIG. 4, determining (404) a masking code (208) in dependence upon the size of the ROM (112) includes searching (406) a lookup table (204) with the size (206) of the ROM (112) and finding (408) in the lookup table (204) the masking code (208) for the size (206) of the ROM. The lookup table (204), in the method of FIG. 3, includes records associating masking codes (208) and sizes (206) of ROM.

In the method of FIG. 4, inverting (412), by use of the masking code (208), to generate the address (218) of recovery BIOS code (116), the most significant bit of the address (202) of the primary BIOS code (114) is carried out by performing (414) a bitwise XOR operation with the masking code (208) and address (202) of the primary BIOS code (114). One bit of the masking code (208) in the example of FIG. 4 corresponds in location to the most significant bit of the address (202) of the primary BIOS code (114). That bit of the masking code (208) has a value of one while all other bits of the masking code having a value of zero. That bit, the bit with a value of one in the masking code, corresponds in location to the bit that is inverted in the address of the primary BIOS code.

Readers of skill in the art will immediately recognize that a bitwise XOR operation is but one way among many of inverting the most significant bit of an address. A bitwise XOR operation may be carried out inexpensively and efficiently in hardware logic. Other logic may be used with different masking codes, more complex control modules with greater data processing power may be implemented, and other electrical hardware components—Field-Effect Transistors (FETs), Bipolar Junction Transistors (BJTs), comparators, Operational Amplifiers (OpAmps), shift register, flip-flops, and so on—may be implemented in the control module to invert the most significant bit of the address of primary BIOS code. Each such implementation and embodiments for inverting the bit is well within the scope of the present invention.

Exemplary embodiments of the present invention are described largely in the context of a fully functional computer system for administering computer processor execution of BIOS code. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of administering computer processor execution of Basic Input/Output Services ('BIOS') code, the BIOS code comprising a primary BIOS code and a recovery BIOS code, the primary and recovery BIOS code stored in read-only memory ('ROM'), the ROM operatively coupled to a control module and the processor, the control module configured to control startup operations of the processor, the method comprising:

determining, by the control module, a size of the ROM;
    generating, by the control module in dependence upon the size of the ROM, an address for the primary BIOS code and an address for the recovery BIOS code; wherein the generating of the recovery address comprises:
        generating a first available memory address comprising a bit pattern of all ones as the address of the primary BIOS code;
        determining a masking code in dependence upon the size of the ROM, the masking code comprising a bit pattern for inverting a most significant bit of the address of the primary BIOS code; and
        inverting, by use of the masking code, to generate the address of recovery BIOS code, the most significant bit of the address of the primary BIOS code by performing a bitwise XOR operation with the masking code and address of the primary BIOS code, a bit of the masking code corresponding in location to the most significant bit of the address of the primary BIOS code, the bit of the masking code having a value of one and all other bits of the masking code having a value of zero;
    starting, by the control module, operation of the processor for execution of the primary BIOS code including providing, to the processor, the address for the primary BIOS code; and
    if executing the primary BIOS code fails, restarting, by the control module, operation of the processor for execution of the recovery BIOS code including providing, to the processor, the address for the recovery BIOS code to the processor.

2. The method of claim 1 wherein determining, by a control module, a size of the ROM further comprises:
    retrieving, from a memory status register of the ROM, an identifier of the ROM; and
    finding the size of the ROM with the ROM identifier in a lookup table comprising a plurality of records associating sizes of ROMs with ROM identifiers.

3. The method of claim 1 wherein determining a masking code in dependence upon the size of the ROM further comprises:
    searching a lookup table with the size of the ROM, the lookup table comprising records associating masking codes and sizes of ROM; and
    finding in the lookup table the masking code for the size of the ROM.

4. An apparatus for administering computer processor execution of Basic Input/Output Services ('BIOS') code, the BIOS code comprising a primary BIOS code and a recovery BIOS code, the primary and recovery BIOS code stored in read-only memory ('ROM'), the ROM operatively coupled to a control module and the processor, the control module configured to control startup operations of the processor, the apparatus comprising a computer processor, a computer memory operatively coupled to the computer processor, the computer memory having disposed within it computer program instructions capable of:

determining, by the control module, a size of the ROM;
    generating, by the control module in dependence upon the size of the ROM, an address for the primary BIOS code and an address for the recovery BIOS code; wherein the generating of the recovery address comprises:
        generating a first available memory address comprising a bit pattern of all ones as the address of the primary BIOS code;
        determining a masking code in dependence upon the size of the ROM, the masking code comprising a bit pattern for inverting a most significant bit of the address of the primary BIOS code; and
        inverting, by use of the masking code, to generate the address of recovery BIOS code, the most significant bit of the address of the primary BIOS code by performing a bitwise XOR operation with the masking code and address of the primary BIOS code, a bit of the masking code corresponding in location to the most significant bit of the address of the primary BIOS code, the bit of the masking code having a value of one and all other bits of the masking code having a value of zero;
    starting, by the control module, operation of the processor for execution of the primary BIOS code including providing, to the processor, the address for the primary BIOS code; and
    if executing the primary BIOS code fails, restarting, by the control module, operation of the processor for execution of the recovery BIOS code including providing, to the processor, the address for the recovery BIOS code to the processor.

5. The apparatus of claim 4 wherein determining, by a control module, a size of the ROM further comprises:
    retrieving, from a memory status register of the ROM, an identifier of the ROM; and
    finding the size of the ROM with the ROM identifier in a lookup table comprising a plurality of records associating sizes of ROMs with ROM identifiers.

6. The apparatus of claim 4 wherein determining a masking code in dependence upon the size of the ROM further comprises:
    searching a lookup table with the size of the ROM, the lookup table comprising records associating masking codes and sizes of ROM; and
    finding in the lookup table the masking code for the size of the ROM.

7. A computer program product for administering computer processor execution of Basic Input/Output Services ('BIOS') code, the BIOS code comprising a primary BIOS code and a recovery BIOS code, the primary and recovery BIOS code stored in read-only memory ('ROM'), the ROM operatively coupled to a control module and the processor, the control module configured to control startup operations of the processor, the computer program product disposed in a computer readable storage device, the computer program product comprising computer program instructions capable of:

determining, by the control module, a size of the ROM;

generating, by the control module in dependence upon the size of the ROM, an address for the primary BIOS code and an address for the recovery BIOS code, wherein the generating of the recovery address comprises:

generating a first available memory address comprising a bit pattern of all ones as the address of the primary BIOS code;

determining a masking code in dependence upon the size of the ROM, the masking code comprising a bit pattern for inverting a most significant bit of the address of the primary BIOS code; and inverting, by use of the masking code, to generate the address of recovery BIOS code, the most significant bit of the address of the primary BIOS code by performing a bitwise XOR operation with the masking code and address of the primary BIOS code, a bit of the masking code corresponding in location to the most significant bit of the address of the primary BIOS code, the bit of the masking code having a value of one and all other bits of the masking code having a value of zero;

starting, by the control module, operation of the processor for execution of the primary BIOS code including providing, to the processor, the address for the primary BIOS code; and if executing the primary BIOS code fails, restarting, by the control module, operation of the processor for execution of the recovery BIOS code including providing, to the processor, the address for the recovery BIOS code to the processor.

8. The computer program product of claim 7 wherein determining, by a control module, a size of the ROM further comprises:

retrieving, from a memory status register of the ROM, an identifier of the ROM; and finding the size of the ROM with the ROM identifier in a lookup table comprising a plurality of records associating sizes of ROMs with ROM identifiers.

9. The computer program product of claim 7 wherein determining a masking code in dependence upon the size of the ROM further comprises:

searching a lookup table with the size of the ROM, the lookup table comprising records associating masking codes and sizes of ROM; and finding in the lookup table the masking code for the size of the ROM.

\* \* \* \* \*